US011846327B2

(12) United States Patent
Bauer

(10) Patent No.: US 11,846,327 B2
(45) Date of Patent: Dec. 19, 2023

(54) HUB ASSEMBLY, HYBRID MODULE COMPRISING THE HUB ASSEMBLY, AND METHOD FOR MOUNTING THE HUB ASSEMBLY

(71) Applicant: ZF FRIEDRICHSHAFEN AG, Friedrichshafen (DE)

(72) Inventor: Thomas Bauer, Großbardorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/771,902

(22) PCT Filed: Nov. 9, 2020

(86) PCT No.: PCT/EP2020/081456
§ 371 (c)(1),
(2) Date: Apr. 26, 2022

(87) PCT Pub. No.: WO2021/094243
PCT Pub. Date: May 20, 2021

(65) Prior Publication Data
US 2022/0397160 A1    Dec. 15, 2022

(30) Foreign Application Priority Data

Nov. 12, 2019    (DE) .................... 10 2019 217 415.9

(51) Int. Cl.
*F16H 45/02*    (2006.01)
*F16H 41/28*    (2006.01)
(Continued)

(52) U.S. Cl.
CPC .......... *F16D 13/644* (2013.01); *F16D 1/033* (2013.01); *F16D 13/52* (2013.01); *F16H 45/02* (2013.01); *F16H 41/28* (2013.01)

(58) Field of Classification Search
CPC ...... F16D 13/00–13/76; F16D 2300/12; F16D 41/00–41/32; F16D 5/02–2045/0294
See application file for complete search history.

(56) References Cited

U.S. PATENT DOCUMENTS

| 3,334,495 A | 8/1967 | Jensen et al. |
| 2009/0107791 A1* | 4/2009 | Zhu .................. F16H 55/36 |
| | | 192/70.14 |

(Continued)

FOREIGN PATENT DOCUMENTS

| CN | 108488248 | 9/2018 |
| DE | 102005045946 | 6/2006 |

(Continued)

OTHER PUBLICATIONS

Definition of "prortion", Cambridge dictionary, May 8, 2023, 1 page. (Year: 2023).*

(Continued)

*Primary Examiner* — Ernesto A Suarez
*Assistant Examiner* — Lillian T Nguyen
(74) *Attorney, Agent, or Firm* — Cozen O'Connor

(57) ABSTRACT

A hub assembly for a hybrid module having a first and a second connection partner arranged coaxially with one another, the first connection partner has a first bearing portion and the second connection partner has a second bearing portion, and a plurality of connecting elements. The first and the second bearing portion have receiving openings for receiving the connecting elements. The first and the second connection partner are prepositioned with respect to one another via a form-fitting connection such that the receiving openings in the first and the second bearing portion are each oriented in pairs in a positionally correct manner with respect to one another in the circumferential direction about the main axis H.

12 Claims, 3 Drawing Sheets

(51) Int. Cl.
    *F16D 13/64*     (2006.01)
    *F16D 1/033*     (2006.01)
    *F16D 13/52*     (2006.01)

(56) References Cited

U.S. PATENT DOCUMENTS

| | | | |
|---|---|---|---|
| 2017/0204952 A1* | 7/2017 | Depraete | F16F 15/1428 |
| 2017/0261044 A1* | 9/2017 | Heidbüchel | F16D 1/00 |
| 2018/0223915 A1* | 8/2018 | Halm | F16D 13/585 |
| 2020/0063860 A1 | 2/2020 | Lee | |

FOREIGN PATENT DOCUMENTS

| | | | |
|---|---|---|---|
| DE | 102007028258 | 12/2008 | |
| DE | 102015216356 | 3/2017 | |
| DE | 102017129262 | 9/2018 | |
| DE | 102018206171 | 10/2019 | |
| WO | WO-2018161998 A1 * | 9/2018 | B60K 6/387 |

OTHER PUBLICATIONS

Office Action of corresponding German Patent Application No. DE 10 2019 217 415.9.

* cited by examiner

HUB ASSEMBLY, HYBRID MODULE COMPRISING THE HUB ASSEMBLY, AND METHOD FOR MOUNTING THE HUB ASSEMBLY

CROSS REFERENCE TO RELATED APPLICATIONS

This is a U.S. national stage of Application No. PCT/EP2020/081456 filed Nov. 9, 2020. Priority is claimed on German Application No. DE 10 2019 217 415.9 filed Nov. 12, 2019 the content of which is incorporated herein by reference.

BACKGROUND OF THE INVENTION

1. Field of the Invention

The disclosure relates to a hub assembly. Furthermore, the disclosure relates to a hybrid module comprising the hub assembly, and to a method for mounting the hub assembly.

2. Description of Related Art

For the mounting of hybrid modules, it is known to realize a connection between two components connected for conjoint rotation, for example a disk carrier and a hub, by a rivet connection. For this purpose, the two bores have to be brought into a congruent position so that a rivet can be plugged through them. This conventionally takes place manually by a worker or in an automated manner via positioning pins, which have to be removed again before the rivets are installed.

The document DE 102017129262 A1, which is probably the closest prior art, discloses a hybrid module for a drive train of a vehicle, having a disk carrier, to which a drive element is attached, wherein the drive element is fastened to the disk carrier in an integrally bonded and/or force-fitting manner, or the drive element is integrated in the disk carrier. In particular, the drive element is fastened to the disk carrier via a welded connection, a rivet connection or a screw connection.

SUMMARY OF THE INVENTION

One aspect of the invention has been set the object of providing a hub assembly of the type mentioned at the beginning which is distinguished by simplified mounting. Furthermore, it is an object of one aspect of the invention to propose a hybrid module comprising the hub assembly, and a method for mounting the hub assembly.

One aspect of the invention by a hub assembly, by a hybrid module, and by a method.

The subject matter of one aspect of the invention is a hub assembly which serves in particular for transmitting a torque. The hub assembly preferably is arranged and/or can be arranged in a drive train, in particular of a vehicle. The hub assembly is particularly preferably coupled and/or can be coupled for conjoint rotation to a shaft which is rotatable about a main axis.

The hub assembly has a first connection partner and a second connection partner. In particular, the first and the second connection partner are designed as two separate components. The first and/or the second connection partner preferably each serve for transmitting the torque to a component coupled in terms of transmission and/or in terms of drive. The first and the second connection partner are arranged coaxially and/or concentrically with respect to one another with respect to a common main axis. The first and/or the second connection partner are preferably formed rotationally symmetrically, with the main axis being defined by an axis of rotation of the connection partner.

The first connection partner has a first contact portion and the second connection partner has a second contact portion. The first and the second connection partner are preferably supported axially on one another with respect to the main axis via their contact portions. For example, the first and/or the second contact portion is designed as a radially inwardly or outwardly directed flange.

The hub assembly has a plurality of connection elements designed and/or are suitable in particular for connecting the connection partners for conjoint rotation. In particular, the connection elements serve for the form-fitting and/or force-fitting connection of the connection partners. In particular, the connection partners are connected and/or are connectable releasably or conditionally releasably to one another via the connection elements. The first and the second contact portion each have a plurality of receiving openings designed and/or are suitable for receiving in each case one connection element. In particular, the receiving openings of the respectively associated contact portion are distributed on a pitch circle about the main axis. In a mounting state, in each case one connection element is guided, in particular in a precisely fitting manner, through a receiving opening of the first contact portion and through a receiving opening of the second contact portion in order to connect the two connection partners to one another for conjoint rotation. Particularly preferably, in an installation situation, the torque is transmitted from the one connection partner to the other connection partner via the connection elements. For example, the receiving openings are configured in the form of bores or apertures.

Within the context of one aspect of the invention, it is proposed that the first and the second connection partner are pre-positioned with respect to one another via a form-fitting connection. In particular, "pre-positioned" should be understood as meaning that, prior to the insertion of the connection elements in end positions defined relative to one another, the connection partners are positioned via the form-fitting connection. The receiving openings of the first and of the second connection portion are each oriented in pairs in a positionally correct manner with respect to one another in the circumferential direction about the main axis when the connection partners are connected via the form-fitting connection. In particular, "in pairs in a positionally correct manner" should be understood as meaning that the receiving openings of the first and of the second connection portion are arranged congruently with respect to one another. Particularly preferably, the two connection partners are fixed relative to one another in the circumferential direction by the form-fitting connection, i.e. are oriented so as to not rotate with respect to one another, and therefore the connection partners are secured against rotation during the mounting of the connection elements. The orientation of the connection partners and the subsequent formation of the form-fitting connection preferably takes place in an automated manner, for example via a robot arrangement.

The advantage of one aspect of the invention consists in particular in that the mounting process can be considerably simplified by the form-fitting connection since a manual orientation or complicated securing via positioning pins is no longer required. In addition, mounting time and effort and thus the mounting costs can be significantly reduced. A further advantage also consists in that the form-fitting contour makes it possible to ensure the mounting security throughout the entire mounting process since the connection partners are completely fixed with respect to one another, or at least only have a small amount of play with respect to one another, and a relative movement between the connection partners during the mounting of the connection elements is either completely prevented or prevented except for a small amount of play.

In one specific refinement, it is provided that the first connection partner has a form-fitting contour and the second connection partner has a form-fitting mating contour. In particular, the form-fitting contour is formed by an elevation and the form-fitting mating contour by a corresponding receptacle, for example a recess or depression. Alternatively, however, the form-fitting contour can also be formed by a receptacle and the form-fitting mating contour by a corresponding elevation. The form-fitting contour and the form-fitting mating contour preferably directly adjoin one another at the respectively associated contact portion. When the receiving openings and the contact portions are correctly positioned, the form-fitting contour and the form-fitting mating contour can be brought into engagement with one another such that the form-fitting connection can be formed.

In a preferred embodiment, it is provided that the form-fitting contour has an edge profile, and that the form-fitting mating contour has a mating profile which is complementary to the edge profile. In particular, the edge profile and accordingly the mating profile is designed as a multi-edge profile, for example as a square profile. In particular, the form-fitting contour is configured in the form of a cylindrical lug, with the edge profile being formed by a plurality of flattened portions, in particular cylinder flattened portions, in the circumferential direction. The form-fitting mating contour is correspondingly configured in the form of a cylindrical receptacle which has just as many flattened portions in the circumferential direction as the cylindrical lug. A form-fitting contour which is distinguished by a particularly simple structural implementation is therefore proposed. In addition, it can be ensured that the bores lie one over another when the edge profile and the mating profile are oriented with respect to one another.

In a further specific implementation, it is provided that the connection elements are each configured in the form of a rivet, and therefore the connection partners are connected to each other for conjoint rotation via a rivet connection. For example, the rivets are configured in the form of solid rivets, hollow rivets or half hollow rivets. In particular, the rivet connection is produced by a cold or hot riveting process. By the correct positioning and fixing of the connection partners in the circumferential direction, the connection elements, which are configured in the form of rivets can be inserted particularly simply, preferably in an automated manner, into the receiving openings.

As an alternative preference, the use of screws or clamping pins as connection elements is also provided.

In a further refinement, it is provided that the first connection partner is designed as a solid component. For example, the first connection partner is designed as a turned part. Alternatively or optionally in addition, the second connection partner and optionally further connection partners are designed as a formed component. For example, the second connection partner is designed as a sheet metal molded component.

In a further specification, it is provided that the hub assembly has a third connection partner. In particular, the third connection partner is designed as a further, separate component. The third connection partner is particularly preferably arranged coaxially and/or concentrically with respect to the two other connection partners with respect to the main axis. The third connection partner has a third contact portion with further receiving openings, which are designed and/or are suitable for receiving the connection elements. Here, the second connection partner, via the second contact portion in an axial direction, and the third connection partner, via the third contact portion in an axial counter direction, are supported on the first contact portion of the first connection partner. In particular, the receiving openings of the third contact portion are distributed on a further pitch circle about the main axis. In a mounting state, in each case one connection element is guided, in particular in a precisely fitting manner, through the receiving openings of the three contact portions in order to connect the three connection partners to one another for conjoint rotation. It is preferably provided, in this embodiment, that the second and the third connection partner each serve for transmitting the torque to a respective component coupled in terms of transmission or in terms of drive, whereas the first connection partner serves for connecting the two other connection partners to one another and/or to a shaft, for example a drive shaft or output shaft.

In a preferred development, it is provided that the first and the third connection partner are pre-positioned with respect to one another via a further form-fitting connection. The receiving openings of the three contact portions are oriented in a positionally correct manner with respect to one another in the circumferential direction about the main axis when the connection partners are connected to one another via the form-fitting connections. All of the connection partners are particularly preferably fixed relative to one another in the circumferential direction by the form-fitting connections such that the connection partners are secured against rotation during the mounting of the connection elements. A simple solution is thus provided of positioning a plurality of connection partners correctly with respect to one another and of securing them against rotation during the mounting process.

In one development, it is provided that the first connection partner has a further form-fitting contour and the third connection partner has a further form-fitting mating contour. In particular, the first connection partner is formed symmetrically with respect to a radial plane of the main axis, wherein the form-fitting contour and the further form-fitting contour are configured in the form of an elevation arranged on both sides or a receptacle. Alternatively, however, the one form-fitting contour can also be formed by an elevation and the other form-fitting contour by a receptacle. When the receiving openings of the first and of the third contact portion are correctly positioned in the circumferential direction about the main axis, the further form-fitting contour and the further form-fitting mating contour can be brought into engagement with one another such that the further form-fitting connection is formed.

One aspect of the invention further relates to a hybrid module for a vehicle comprising the hub assembly as has already been described above. The hybrid module preferably comprises an electric machine which preferably acts in a parallel hybrid drive together with an internal combustion engine on a drive train of the vehicle. In particular, the hybrid module is configured in the form of what is referred to as a P1 hybrid module. A P1 hybrid module is understood as meaning a hybrid module, which is arranged in the drive train between the internal combustion engine and a transmission, wherein the electric machine is coupled fixedly to a drive shaft of the internal combustion engine. Alternatively, the hybrid module is configured in the form of what is referred to as a P2 hybrid module. A P2 hybrid module is understood as meaning a hybrid module which is arranged in the drive train between the internal combustion engine and the transmission, wherein the internal combustion engine can be disengaged from or engaged with the electric machine via a clutch device, in particular a separating clutch.

According to this embodiment, the first connection partner is configured in the form of a hub component, which is designed and/or is suitable for arrangement on a shaft for conjoint rotation. In particular, the shaft can be configured in the form of the drive shaft or a transmission input shaft of the transmission. The hub component preferably has a central shaft receptacle through which the shaft is guided. For example, the shaft receptacle has an internal toothing, in particular a plug-in toothing, via which the hub component can be connected to the shaft for conjoint rotation.

Alternatively, the first connection partner is configured in the form of a flange component which is designed and/or is suitable for connecting to a further component for conjoint rotation. The further component can be configured, for example, in the form of a dual mass flywheel. The flange component preferably has an attachment portion, which serves for attaching to the further component for conjoint rotation. For example, the attachment portion has an external toothing, in particular a plug-in toothing, via which the flange component can be connected to the further component for conjoint rotation.

In addition, the second connection partner is configured in the form of a disk carrier, which is designed and/or is suitable for a multi-disk clutch. In particular, the disk carrier is suitable for the separating clutch, which is also known as a K0 clutch. Alternatively, the disk carrier is suitable for a further clutch device, in particular a dual clutch, which serves for selectively transmitting torque to the transmission. The disk carrier is preferably configured in the form of an inner disk carrier.

Alternatively, the second connection partner or, optionally additionally, the third connection partner is configured in the form of a blade wheel, which is designed and/or suitable for an, in particular hydrodynamic, torque converter. The blade wheel is preferably configured in the form of a turbine wheel or, alternatively, as a pump impeller of the torque converter.

Alternatively, the second connection partner or, optionally additionally, the third connection partner is configured in the form of a rotor carrier, which is designed and/or is suitable for the electric machine. The electric machine preferably has a rotor, which is arranged coaxially with respect to the main axis. In particular, the rotor is arranged on the rotor carrier for conjoint rotation.

One aspect of the invention furthermore relates to a method for mounting the hub assembly as has already been described above. The method comprises:

Providing the first connection partner;
Pre-positioning the second connection partner with respect to the first connection partner via the form-fitting connection in order to orient the receiving openings of the first and of the second contact portion in pairs in a positionally correct manner with respect to one another in the circumferential direction about the main axis;
Inserting in each case one connection element into the receiving openings oriented in pairs in a positionally correct manner with respect to one another, in order to connect the connection partners to one another for conjoint rotation.

In particular, one of the connection partners is positioned in advance on a carrier, which at the same time forms part of a tool for the connection elements. During the pre-positioning of the two connection partners, the first connection partner, with its form-fitting contour, and the second connection partner, with its form-fitting mating contour, are connected in a form-fitting manner to one another in the circumferential direction, wherein the receiving openings thereof are positioned correctly with respect to one another. In particular, the robot arrangement serves for carrying out the method. The pre-positioning of the connection partners and/or the insertion of the connection elements are/is carried out here in an automated manner by at least one or more robots.

In a further specification, it is provided that the at least two connection partners and optionally the third connection partner are connected to one another via a riveting operation. For this purpose, the connection partners, which are configured in the form of rivets are inserted into the receiving openings, which are arranged in a positionally correct manner with respect to one another, and are plastically deformed by a riveting tool in order to form the rivet connection. The carrier particularly preferably forms one half of the riveting tool, in particular a counter holder.

It is optionally provided that, in an intermediate step, in particular prior to the insertion of the connection elements, the third connection partner is pre-positioned correctly with respect to the first connection partner via the further form-fitting connection in order to orient the receiving openings of the first and of the third receiving portion in pairs in a positionally correct manner with respect to one another in the circumferential direction about the main axis. The first connection partner, with its further form-fitting contour, and the third connection partner, with its further form-fitting mating contour, are connected in a form-fitting manner to one another in the circumferential direction, wherein the receiving openings thereof are positioned correctly with respect to one another.

BRIEF DESCRIPTION OF THE DRAWINGS

Further features, advantages and effects of the invention emerge from the description below of preferred exemplary embodiments of the invention. In the figures.

DETAILED DESCRIPTION OF THE PRESENTLY PREFERRED EMBODIMENTS

Figure 1:
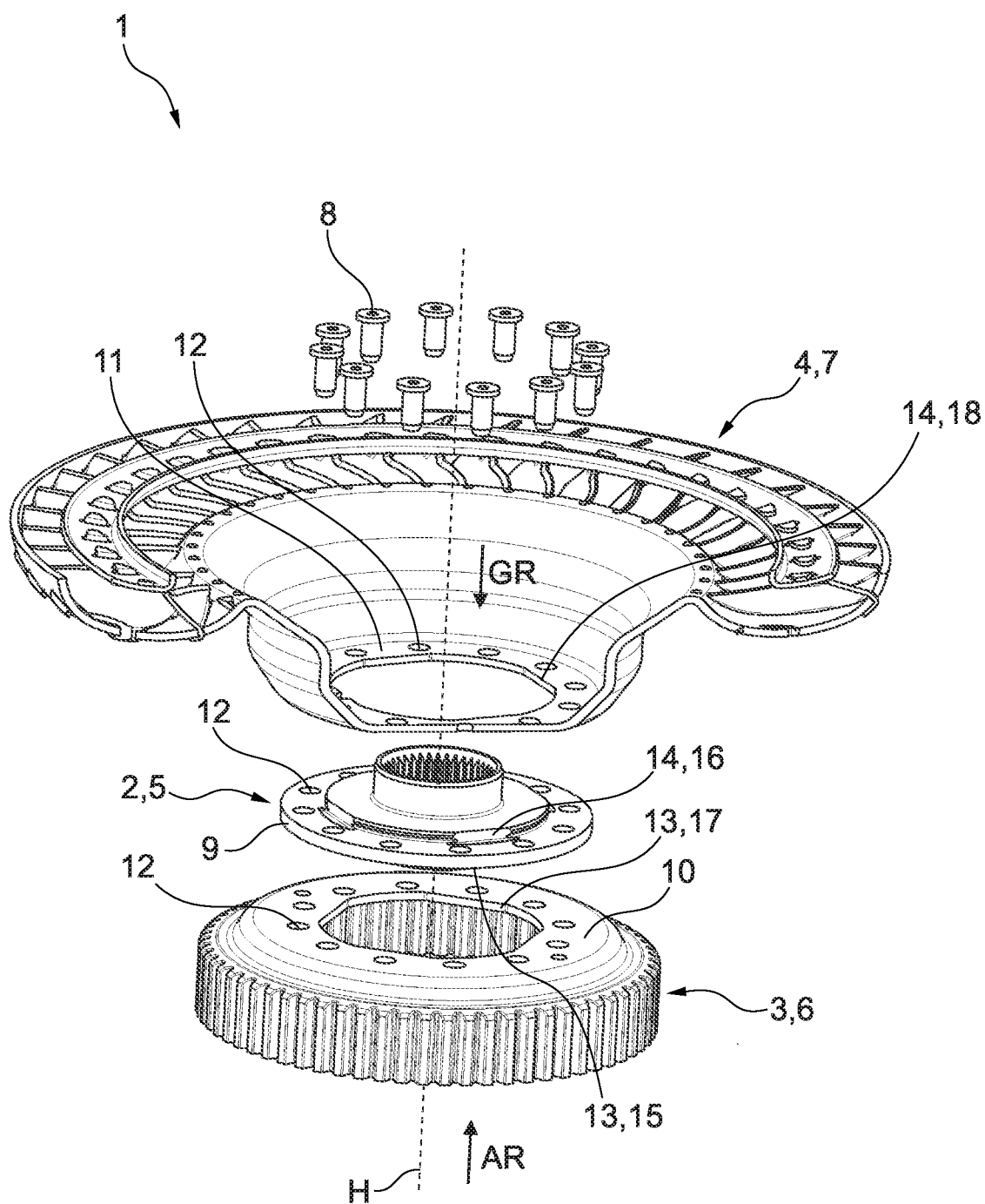
FIG. 1 is an exploded illustration of a hub assembly for a hybrid module.

FIG. 1 shows, in an exploded illustration, a hub assembly 1 for a hybrid module, not illustrated, as one exemplary embodiment of the invention. The hub assembly 1 serves here for transmitting a torque between a plurality of connection partners 2, 3, 4, which are arranged coaxially with respect to one another with respect to a main axis H. For example, the hub assembly 1 is suitable for a P1 or P2 hybrid module. In the exemplary embodiment which is shown, the hub assembly 1 is arranged, for example, in a torque path between a hydrodynamic torque converter, not illustrated, and a clutch device, not illustrated.

A first connection partner 2 is configured here in the form of a hub component 5, in particular an output hub, which can be arranged on a shaft, not illustrated, for conjoint rotation. For example, the shaft can be a drive shaft driven by an internal combustion engine or a transmission shaft forming a transmission input. A second connection partner 3 is configured in the form of a disk carrier 6, in particular an inner disk carrier, for the clutch device, for example a dual clutch or a separating clutch. The clutch device is preferably configured in the form of a multi-disk clutch, wherein the disk carrier 6 is connected to the shaft via the hub component 5 for conjoint rotation. A third connection partner 4 is configured in the form of a blade wheel 7, in particular a turbine wheel, for the torque converter, wherein the blade wheel 7 is connected to the shaft via the hub component 5 for conjoint rotation. The first connection partner 2 is designed, for example, as a solid component, for example as a turned part, and the second and the third connection partners 3, 4 are each designed as a formed component, for example as a sheet-metal molded component.

The connection partners 2, 3, 4 are connected to one another via a plurality of connection elements 8 for conjoint rotation. For this purpose, the first connection partner 2 has a first contact portion 9, the second connection partner 3 has a second contact portion 10, and the third connection partner 4 has a third contact portion 11. The first contact portion 9 is designed as a radially outwardly directed flange, wherein the second and the third contact portions 10, 11 are each designed as a radially inwardly directed flange. The second connection partner 3 lies here in an axial direction AR on one side of the first contact portion 9 and the third connection partner 4 in an axial counter direction GR on another side of the first contact portion 9.

The contact portions 9, 10, 11 of the three connection partners 2, 3, 4 each have a plurality of receiving openings 12 for receiving the connection elements 8. The receiving openings 12 are designed as through bores, wherein in each case one connection element 8 is guided through a receiving opening 12 of the first, the second and the third contact portion 9, 10, 11.

For the insertion of the connection elements 8, the receiving openings 12 of all of the connection partners 2, 3, 4 have to be brought into a congruent position so that the connection elements 8 can be plugged through them without obstruction. The connection elements 8 are each configured in the form of a rivet, for example a hollow rivet, and are subsequently riveted in an automated manner, for example by a robot. The positioning of components for the subsequent riveting has hitherto taken place by a worker or in an automated manner via positioning pins, which have to be identified in a time-consuming and complicated manner in terms of programming, for example by a robot, assigned and removed again prior to the mounting of the connection elements 8. In order to avoid this, other solutions for congruently positioning the receiving openings 12 have to be found.

According to one aspect of the invention, a form-fitting connection 13 between the first and the second connection partner 2, 3 and a further form-fitting connection 14 between the first and the third connection partner 2, 4 in the circumferential direction about the main axis H are proposed. For this purpose, the hub component 5 has a form-fitting contour 15, here concealed by the first contact portion 9, and a further form-fitting contour 16, wherein the disk carrier 6 has a form-fitting mating contour 17, which is complementary to the form-fitting contour 15, and the blade wheel 7 has a further form-fitting mating contour 18, which is complementary with respect to the further form-fitting contour 16. In this exemplary embodiment, the hub component 5 is formed at least approximately symmetrically with respect to a radial plane of the main axis H, wherein "approximately" should be understood as meaning that the form-fitting contours 16, 17 may be formed identically on both sides but may be offset with respect to one another in the circumferential direction.

The form-fitting contours 15, 16 are formed on both sides in each case by a cylindrical lug, the lugs each directly adjoining the first contact portion 9. In order to form an edge profile, in particular a square profile, the form-fitting contours 15, 16 each have a plurality of flattened portions, in particular flattened sides of the cylindrical lug. The form-fitting mating contours 17, 18 are each formed as corresponding apertures which are radially delimited or defined by the respective contact portion 10, 11. In order to form a mating profile, the form-fitting mating contours 17, 18 likewise have a plurality of flattened portions. If the edge profile and the associated mating profile are in each case oriented with respect to each other, it is ensured that the receiving openings 12 lie one above another in a positionally correct manner and the respective connection partners 2, 3, 4 are secured against rotation. The form-fitting connections 13, 14 are not involved here in the transmission of torque, but rather serve merely for positioning the connection partners 2, 3, 4 with respect to one another.

It is preferred that the positioning and the orientation of the connection partners 2, 3, 4 with respect to one another is likewise realized by the robot. In an exemplary mounting sequence, it is provided that, in a first step, the inner disk carrier 6 is pre-positioned on a tool carrier, not illustrated, for example by the robot. The tool carrier can at the same time form one half, for example the counter holder, of a riveting tool. In a further step, the hub component 5 is placed with its form-fitting contour 16 in the form-fitting mating contour 17 of the inner disk carrier 6 such that the form-fitting connection 13 is formed and the receiving openings 12 of the two connection partners 2, 3 are oriented in a positionally correct manner with respect to one another. Subsequently, the blade wheel 7 is placed with the further form-fitting mating contour 18 on the opposite further form-fitting contour 16 of the hub component 5 such that the further form-fitting connection 14 is formed and the receiving openings 12 of the two connection partners 3, 4 are oriented in a positionally correct manner with respect to one another. Finally, the robot inserts the connection elements 8, which are configured in the form of rivets, into the congruent receiving openings 12 and carries out the riveting operation such that the three connection partners 2, 3, 4 are connected to one another via a rivet connection for conjoint rotation.

Figure 2:
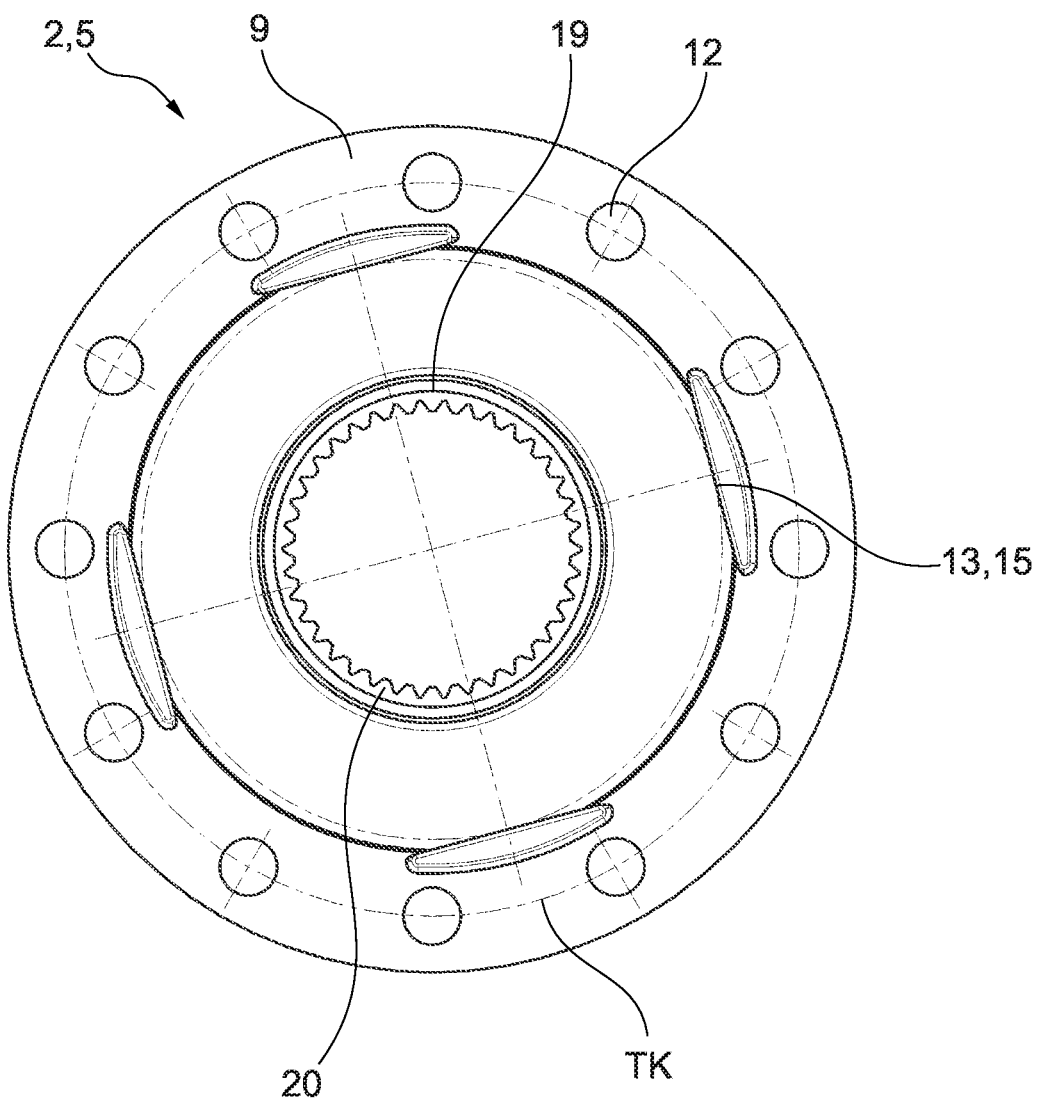
FIG. 2 is an axial view of a hub component of the hub assembly from FIG. 1.

FIG. 2 shows the hub component 5 of the hub assembly 1 of FIG. 1 in an axial view with respect to the main axis H. In order to receive the shaft, the hub component 5 has a central shaft receptacle 19 through which the shaft can be passed in an installation situation. The shaft receptacle 19 has an internal toothing 20, in particular a plug-in toothing, via which the hub component 5 can be connected for conjoint rotation to a corresponding mating toothing of the shaft.

The receiving openings 12, distributed on a common pitch circle TK and encircling the main axis H, are introduced into the first contact portion 9. The first contact portion 9 can have, for example, more than four, preferably more than ten, especially more than twenty of the receiving openings 12. In order to form the edge profile, the flattened portions of the form-fitting contours 15, 16 are in each case arranged diametrically opposite one another. The form-fitting contours 15, 16 can have, for example, more than two, for example three, preferably more than four, for example five, especially more than eight of the flattened portions.

Figure 3A:
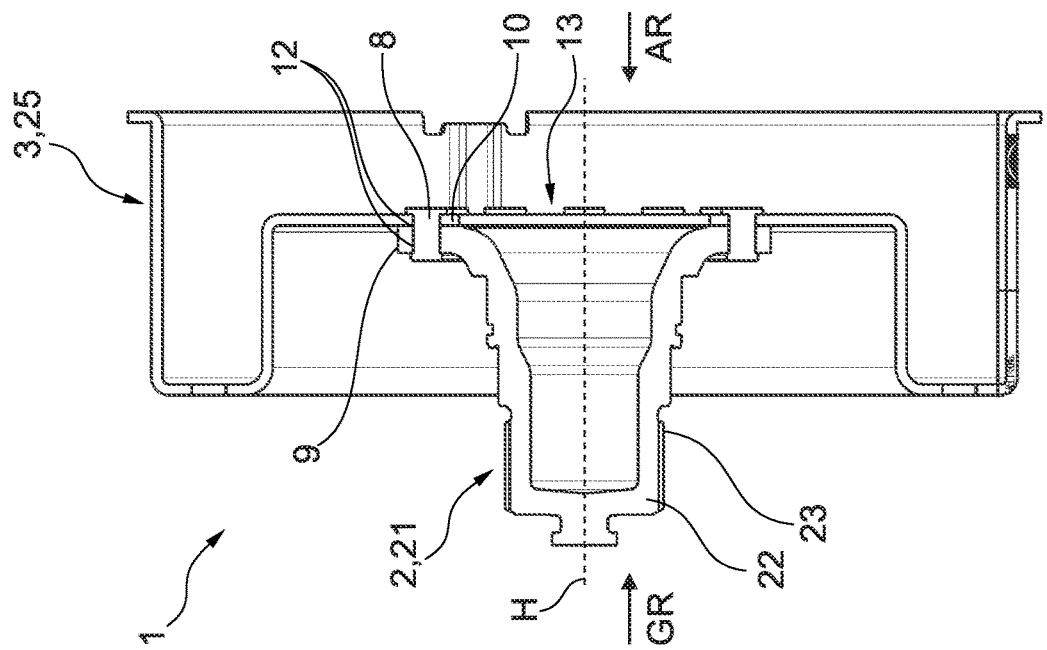
FIGS. 3A, B are sectional illustrations of an alternative hub assembly.

FIGS. 3a, b each show, in a schematic sectional illustration, two different embodiments of the hub assembly 1 as further exemplary embodiments of the invention. The hub assemblies 1 illustrated in FIGS. 3a, b serve for transmitting a torque between precisely two connection partners 2, 3, which are arranged coaxially with respect to one another with respect to the main axis H.

The hub assembly 1 shown in FIG. 3a can be arranged, for example, in a torque path between a dual mass flywheel, not illustrated, and a separating clutch, not illustrated. In this embodiment, the first connection partner 2 is configured in the form of a flange component 21, in particular a bearing flange, which can be connected, for example, for conjoint rotation to a flywheel mass, not illustrated, of the dual mass flywheel. For this purpose, the flange component 21 has an attachment portion 22 with an external toothing 23, in particular a plug-in toothing, via which the flange component 21 can be attached. The second connection partner 3 is configured in the form of a further disk carrier 24, in particular an inner disk carrier, for the separating clutch. The separating clutch is configured, for example, in the form of a multi-disk clutch, wherein the further disk carrier 24 can be connected via the flange component 21 to the dual mass flywheel for conjoint rotation. The flange component 21 is designed, for example, as a solid component, for example as a turned part, and the further disk carrier 24 is designed as a formed component, for example as a sheet metal molded component.

The two connection partners 2, 3 are connected to one another via the plurality of connection elements 8 for conjoint rotation, wherein the first contact portion 9 is designed as a radially outwardly directed flange and the second contact portion 10 is designed as a radially inwardly directed flange. The further inner disk carrier 24 lies here with its contact portion 10 in the axial direction AR on the first contact portion 9, wherein in each case one connection element 8 is guided through in each case one receiving opening 12 of the first and of the second contact portion 9, 10.

Figure 3B:
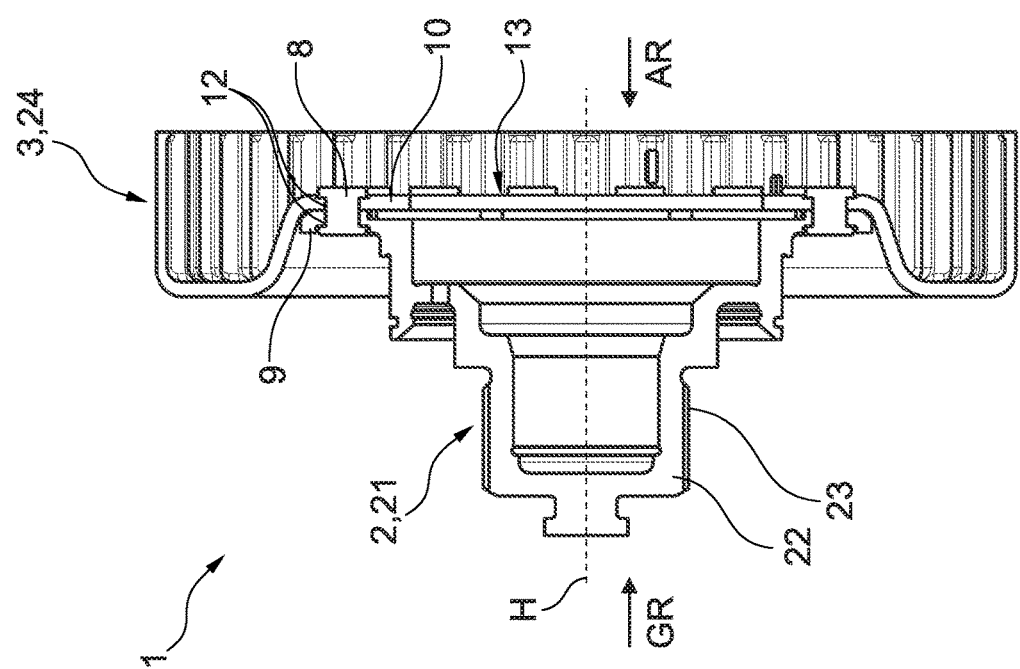

The hub assembly 1 shown in FIG. 3b can be arranged, for example, in a torque path between a dual mass flywheel, not illustrated, and an electric machine, not illustrated. In this embodiment, the first connection partner 2 is designed as a flange component 21, as has already been described above. By contrast, the second connection partner 3 is configured in the form of a rotor carrier 25 for a rotor of the electric machine, wherein the rotor carrier 25 is connected via the flange component 21 to the dual mass flywheel for rotation therewith. The rotor carrier 25 lies here with its contact portion 10 in the axial direction AR on the contact portion 9 of the flange component 21, wherein in each case one connection element 8 is guided through in each case one receiving opening 12 of the first and of the second contact portion 9, 10. The flange component 21 is designed, for example, as the solid component and the rotor carrier 24 as a formed component, for example as a sheet metal molded component.

It is preferably provided that the flange component 21 has the form-fitting contour 15 and that the further disk carrier 24 or the rotor carrier 25 has the form-fitting mating contour 25 such that the form-fitting connection 13 between the flange component 21 and the further disk carrier 24 or the rotor carrier 25 is formed in the circumferential direction about the main axis H in order to position the receiving openings 12 of the two connection partners 2, 3 correctly with respect to one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hub assembly, comprising:
a first connection partner having a first contact portion;
a second connection partner having a second contact portion;
wherein the first connection partner and the second connection partner are arranged coaxially with respect to each other with respect to a common main axis;
a plurality of connection elements, wherein the first connection partner and the second contact portion each have a plurality of receiving openings configured to receive a respective connection element, wherein the respective connection element is guided through a respective receiving opening of the first contact portion and through a respective receiving opening of the second contact portion such that the first connection partner and the second connection partner are connected to each other for conjoint rotation via the plurality of connection elements;
a form-fitting connection configured to preposition the first connection partner and the second connection partner such that the respective receiving openings of the first and of the second contact portion are each oriented in pairs in a positionally correct manner with respect to one another in a circumferential direction about the common main axis; wherein the first connection partner has a first connection partner form-fitting contour and the second connection partner has a form-fitting mating contour, wherein the first connection partner form-fitting contour and the form-fitting mating contour each comprises at least one respective flat.

2. The hub assembly as claimed in claim 1, wherein, when the respective receiving openings are correctly positioned in the circumferential direction about the main axis, the first connection partner form-fitting contour and the form-fitting mating contour can be brought into engagement with each other such that the form-fitting connection is formed.

3. The hub assembly as claimed in claim 2, wherein the first connection partner form-fitting contour has an edge profile, and the form-fitting mating contour has a mating profile that is complementary to the edge profile.

4. The hub assembly as claimed in claim 1, wherein the plurality of connection elements are each a rivet.

5. The hub assembly as claimed in claim 1, wherein the first connection partner is a solid component and/or the second connection partner is a sheet metal molded component.

6. The hub assembly as claimed in claim 1, further comprising:
a third connection partner,
wherein the third connection partner has a third contact portion with further receiving openings for receiving the plurality of connection elements,
wherein the second connection partner, via the second contact portion in an axial direction, and the third connection partner, via the third contact portion in an axial counter direction, are supported on the first contact portion of the first connection partner, and
wherein one connection element is guided through the receiving openings of the first contact portion, second contact portion, and third contact portion such that the three connection partners are connected to one another for conjoint rotation via the plurality of connection elements.

7. The hub assembly as claimed in claim 6, wherein the first connection partner and the third connection partner are prepositioned with respect to one another via a further form-fitting connection such that the receiving openings of the first contact portion, the second contact portion, and the third contact portion are oriented in a positionally correct manner with respect to one another in the circumferential direction about the main axis.

8. The hub assembly as claimed in claim 7, wherein the first connection partner has a further form-fitting contour and the third connection partner has a further form-fitting mating contour, wherein, when the receiving openings are correctly positioned in the circumferential direction about the main axis, the further form-fitting contour and the further form-fitting mating contour can be brought into engagement with each other such that the further form-fitting connection is formed.

9. A hybrid module for a vehicle comprising:
a hub assembly, comprising:
a first connection partner having a first contact portion;
a second connection partner having a second contact portion;
wherein the first connection partner and the second connection partner are arranged coaxially with respect to each other with respect to a common main axis;
a plurality of connection elements, wherein the first connection partner and the second contact portion each have a plurality of receiving openings configured to receive the plurality of connection elements, wherein a respective connection element is guided through a respective receiving opening of the first contact portion and through a respective receiving opening of the second contact portion such that the first connection partner and the second connection partner are connected to each other for conjoint rotation via the plurality of connection elements;
a form-fitting connection configured to preposition the first connection partner and the second connection partner such that the respective receiving openings of the first and of the second contact portion are each oriented in pairs in a positionally correct manner with respect to one another in a circumferential direction about the common main axis, wherein the first connection partner has a first connection partner form-fitting contour and the second connection partner has a form-fitting mating contour;
wherein the first connection partner form-fitting contour and the form-fitting mating contour each comprise at least one respective flat;
wherein the first connection partner is configured as a hub component for arranging on a shaft for conjoint rotation or as a flange component for connecting to a further component for conjoint rotation, and the second connection partner is configured as:
a disk carrier for a multi-disk clutch or
a blade wheel for a torque converter, or
a rotor carrier for an electric machine.

10. A method for mounting a hub assembly, comprising:
providing a first connection partner having a first contact portion;
providing and prepositioning a second connection partner having a second contact portion with respect to the first connection partner via a form-fitting connection to orient receiving openings of the first contact portion and the second contact portion in pairs in a positionally correct manner with respect to one another in a circumferential direction about a main axis;
inserting in each case one connection element into respective receiving openings oriented in pairs in a positionally correct manner with respect to one another, in order to connect the first connection partner and the second connection partner to each other for conjoint rotation;
providing the first connection partner has a first connection partner form-fitting contour and the second connection partner has a form-fitting mating contour;
providing the first connection partner form-fitting contour and the form-fitting mating contour each comprises at least one respective flat.

11. The method as claimed in claim 10, wherein the connection elements are as rivets, wherein the first connection partner and the second connection partner are connected to one another via a riveting operation.

12. The method as claimed in claim 10, wherein, in an intermediate step, a third connection partner is prepositioned correctly with respect to the first connection partner via a further form-fitting connection, and the receiving openings of a first receiving portion and of a third receiving portion are oriented in pairs in a positionally correct manner with respect to one another in the circumferential direction about the main axis.

* * * * *